March 18, 1930.  L. B. JONES  1,750,639
INDUSTRIAL TRUCK AND THE LIKE
Filed Feb. 17, 1927  4 Sheets-Sheet 1

Inventor
Lee B. Jones

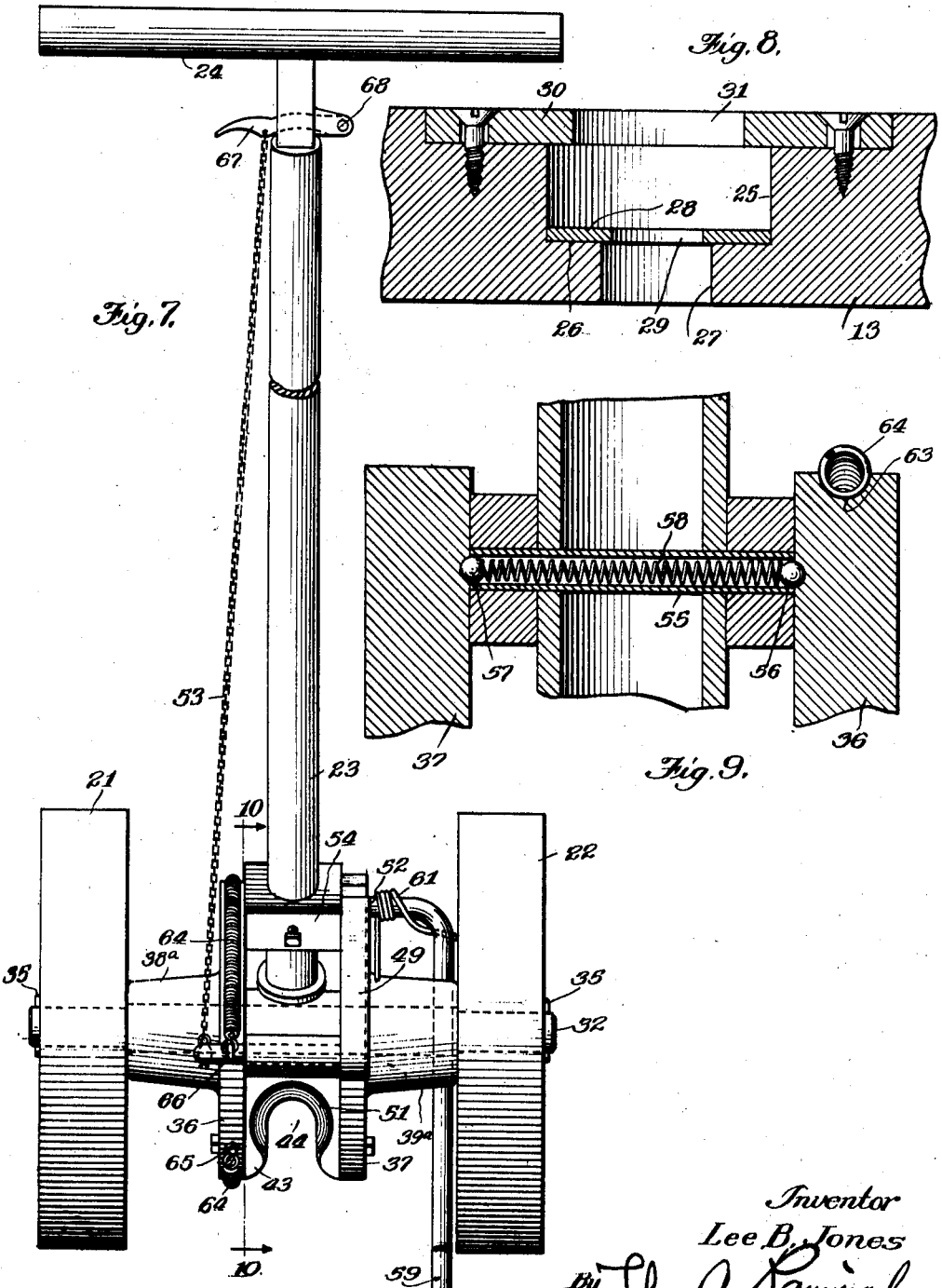

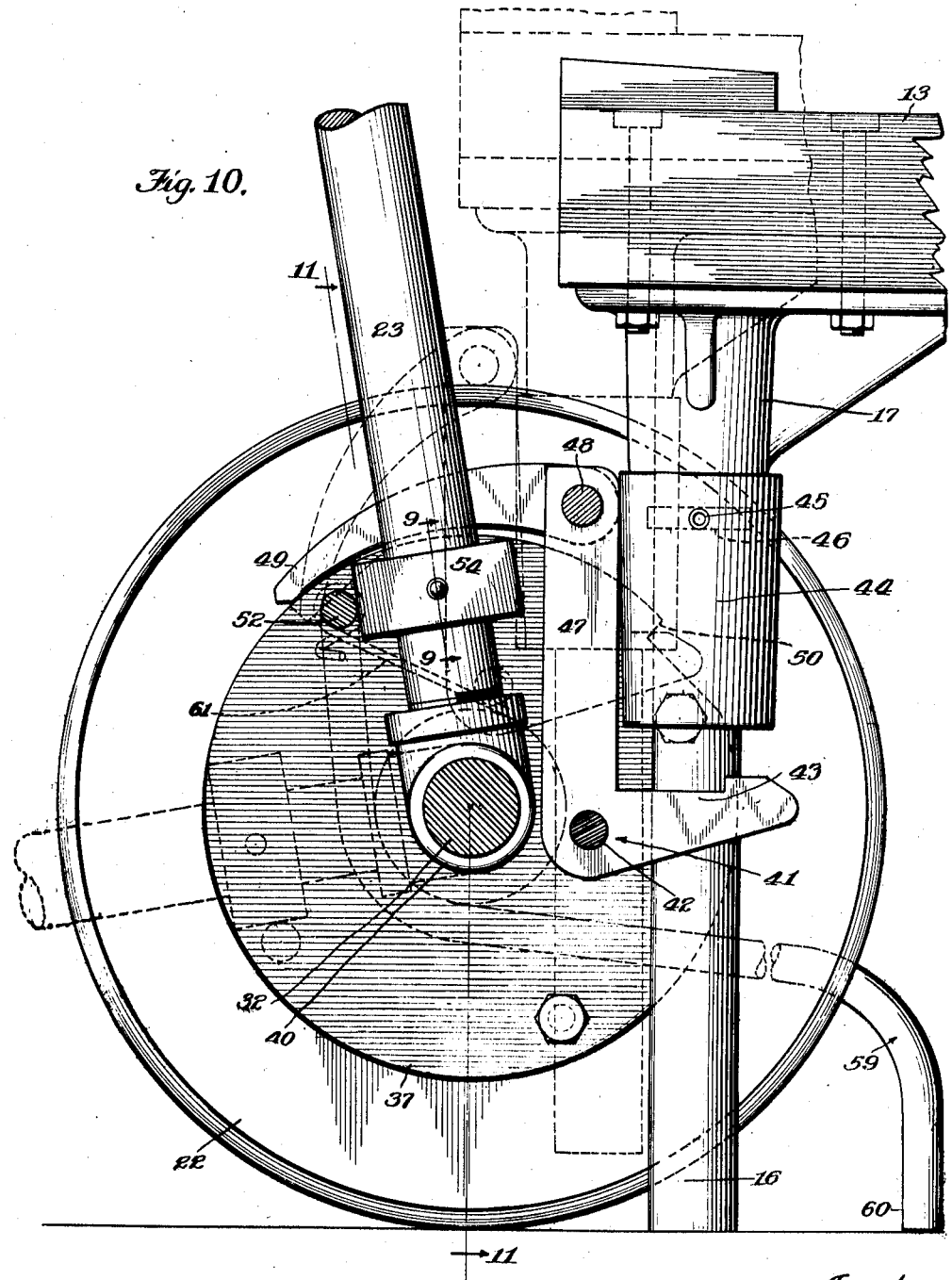

March 18, 1930.  L. B. JONES  1,750,639
INDUSTRIAL TRUCK AND THE LIKE
Filed Feb. 17, 1927  4 Sheets-Sheet 4
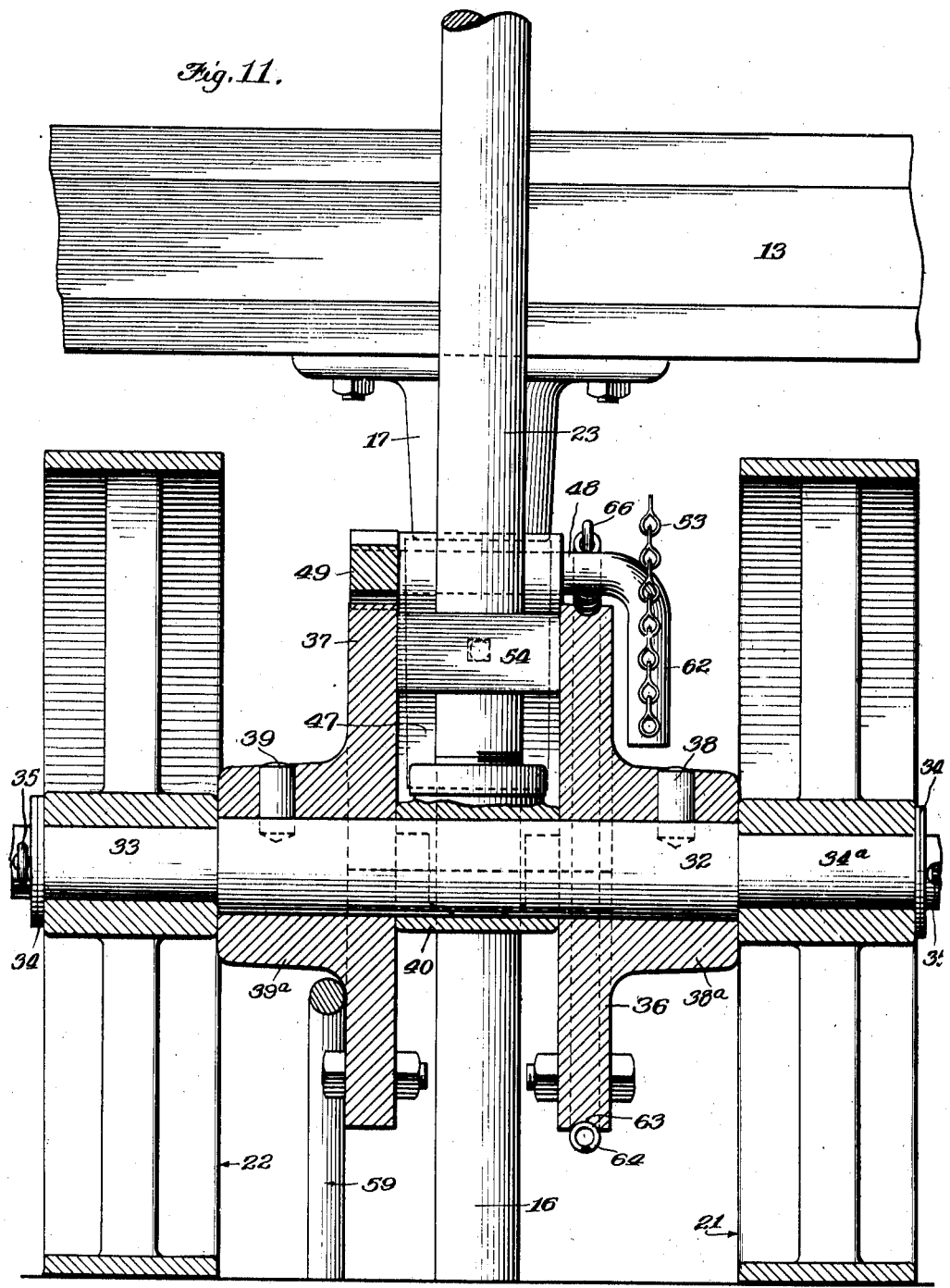

Patented Mar. 18, 1930

1,750,639

UNITED STATES PATENT OFFICE

LEE B. JONES, OF KANSAS CITY, MISSOURI

INDUSTRIAL TRUCK AND THE LIKE

Application filed February 17, 1927. Serial No. 168,944.

The present invention has to do with certain improvements in industrial trucks and the like. These trucks are primarily intended for use in transporting packages and other goods in and around warehouses, factories, railway terminals, industrial yards and many other similar locations. In mentioning these particular uses of the invention, however, I do not intend thereby to limit myself in any respect except as I may do so in the claims.

One of the objects of the invention is to provide an industrial truck arrangement comprising a wheeled platform or a series of such platforms, each of which is self-sustaining as will be presently explained hereafter; together with a relatively small compact and easily manipulated lift truck by the use of which any selected platform member may be readily engaged and moved around either individually or in trains; said lift truck being so constituted that it may be readily disengaged from said wheeled platform preparatory to using it in connection with another wheeled platform or train of such platforms.

One of the objects of the invention is to provide a wheeled platform having a pair of rear wheels together with a downwardly reaching central support adjacent to the front end of the platform, said central support preferably taking the form of a downwardly reaching pin secured to the bottom of the platform at its center line and reaching down to such position that when resting upon the floor the platform will be sustained in a substantially horizontal position. This central support at the front end, together with the rear wheels at the rear end of the platform constitute a three point support for the platform besides which other advantages are secured which will be presently pointed out.

A further object of the invention is to provide each platform with a socket, preferably located on the center line of the platform and reaching down from the top surface of the platform; each of the said sockets being sufficiently large to freely accommodate and carry the lower end of the central support pin of the next succeeding platform of a train. When so used the succeeding or following platform reaches up over and partially covers the platform immediately preceding it in the train, and each of the follower or succeeding platforms is tilted at a considerable angle due to the raising of its front central support to a position high enough to set into the socket referred to. At the same time the rear portion of each of the tilting platforms is supported by its rear wheels, the amount of tilting not being sufficient to bring its rear edge into actual contact with the floor.

It is a further object to so arrange and proportion the platforms that when they are nested or set together into such a train as just described, the different platform units will not mutually interfere with each other, but each platform will still be supported on its three point support; and it is a further object to so proportion the parts that a train of such platforms so nested together can be drawn along or turned around sharp corners and otherwise very conveniently and satisfactorily manipulated under operating and using conditions which could not be successfully encountered with previous constructions of such devices.

A further object of the invention is to so position the rear wheels of each platform, with respect to the rear edge of said platform, that the platforms may be tilted up and stood in a self-supporting manner with support provided solely by the rear wheels and rear edge. Under these conditions the amount of floor space occupied for storage of the platform is reduced to a minimum since even when standing in this nearly up-right position a certain amount of nesting of the successive platforms may be produced.

A further feature of the invention relates to the provision of a construction such that the front central support and the socket aforesaid will be given a maximum degree of strength in the platform itself. This result I accomplish by reason of the fact that it is customary to build the platforms themselves from an odd number of longitudinally extending boards which are generally tongued and grooved together, being also fastened by cross pieces at their front and rear ends; and the front central support as well as the socket are therefore conveniently secured to or into the center board of such series (generally either three or 5 boards), thus making it possible to use the full strength of such center board for supporting the parts in question.

A further feature of the invention relates to the provision of an improved construction of lift truck which is a self-contained two wheeled unit and may be used for lifting and supporting and carrying the front portion of any selected platform of a series. This wheeled lift truck is so constructed that it may be readily wheeled into position adjacent to the downwardly extending central support of the selected platform, and may be then readily manipulated so as to engage said central support and lift the front portion of the platform slightly thereby assuming and carrying the load of the front portion of the platform, and at the same time lifting the lower end of the central support away from the floor a sufficient amount to prevent interference between said lower end and the surface of the floor.

In connection with the foregoing it is a further object to place around the central support aforesaid what may be termed a fifth wheel, being in effect a flange or sleeve which is rotatably mounted on the central support, the lower end of said sleeve being directly carried by the proper portion of the lift truck when the parts are engaged. This fifth wheel arrangement also greatly reduces the friction between the parts when turning corners, since the lift truck may turn with respect to the central support much more easily by reason of the presence of said fifth wheel than would otherwise be possible.

Another feature of the invention is the provision of a lift truck of such construction with respect to the central support that the lift truck itself may have a considerable latitude of side swing or oscillation with respect to the central support, without any disengagement of the parts, the lower end of the fifth wheel serving to maintain proper engagement with the lift truck at all times during such side swing. This will make it possible for the lift truck to ride over obstructions of an uneven nature in the floor which cause the truck to ride higher on one side than the other. At the same time such unevenness in the floor will not generate any strains either in the lift truck or the platform itself.

In connection with the foregoing it is an object to provide a lift truck having a pair of supporting wheels which are mounted upon a central axle in the lift truck, said wheels themselves being placed relatively close together, but being of a relatively large diameter. This enlargement of the diameter of the wheels of the lift truck results in the provision of a lift truck which will ride over obstructions or inequalities in the surface of the floor, or which will be able to ride up and onto "breaks" in the surface of the floor with a minimum amount of effort on the part of the workman.

The diameter of the wheels of the lift truck is substantially limited only by the clearance of the platform above the floor, since manifestly the lift truck wheels cannot pass beneath the platform if they are of greater diameter than the clearance of the platform above the floor. I am enabled to use lift truck wheels of this large size by reason of the fact that I make use of a construction in which the engagement of the lift truck with the platform is by a male and female joint connection, the male member being the central support of the platform and the female member being the socket of the lift truck. The arrangement is such that the central support of the platform passes between the two wheels of the lift truck so that it is not necessary to place anything above the wheels of the lift truck which would thereby limit the diameter of the said wheels.

A further object of the invention is to provide a lift truck having a guiding and manipulating handle bar of sufficient length to render the operations of the device relatively easy and positive. At the same time said handle is so arranged that by properly manipulating it the operating parts of the lift truck are properly operated to take or sustain the load of the platform or be disengaged therefrom. This handle arrangement is such that when the lift truck is disengaged from the platform the handle normally stands in an upright position (being its normal position when the lift truck is supported by its brake foot). Upon turning the handle downwards through an angle of substantially 90° and thereby bringing its outer end close to the floor, the lift truck is caused to assume the load of the platform and at the same time the parts are latched so that the platform load is thereafter sustained without effort on the part of the workman. Thereupon the workman may move his handle up and down freely through a wide angle, the load of the platform being supported by the lift truck all the while.

In connection with the foregoing it is a further object of the invention to so relate the parts that the maximum lifting force required to take the load of the platform is required at the beginning of this movement, and at the time when the handle stands in the upright position where it can most conveniently be manipulated by the workman. As the handle is swung down to a position close to the floor, where it cannot be so conveniently nor effectively manipulated, the mechanical advantage of the lift device increases, these making it unnecessary for the workman to exert as much force when stooping over and in an inconvenient position as is necessary to commence the operation.

Another object of the invention is to provide means for insuring a self-support for the lift truck when it is disengaged from the platform. This takes the form of a swinging foot which is normally thrown out by a spring tension into a position where it serves to properly support the lift truck on the level floor as a self-contained unit and with its handle in the upright position. At the same time the spring tension exerted on this foot is such as to allow the foot to be readily forced back upon occasion and without damage, as for example, in case it should become entangled with any part of a platform or other device.

A further object of the invention is to provide a lift truck of such construction that it can be run under the front portion of a platform from almost any direction through a range of substantially 180° of circular arc. That is to say the lift truck can be run under the front portion of the platform from either side or from the front or from almost any intermediate position and the parts can then be properly engaged to cause the lift truck to assume and carry the load of the platform. This results in an arrangement having a very great range of usability and makes it possible to greatly increase the usefulness of the industrial trucks as well as improving the economy of the loading and unloading operations.

In connection with the foregoing I may state that in order to most economically transfer loads to and from industrial trucks and box cars I have found that it is most desirable to be able to run the truck platform into the car and then turn it around so as to bring its front end adjacent to the inside wall of the car, the body of the platform reaching into the interior of the car and at right angles to the wall. In order to engage or disengage the lift truck with the platform under these conditions it is necessary to be able to bring the lift truck into engagement with the platform from the side of the platform instead of the front thereof, and this result I can accomplish by reason of the structure herein disclosed.

Numerous other features and objects of the invention will appear from a detailed description thereof which consists in the features of construction and combination of the parts hereinafter described and claimed.

In the drawings:

Fig. 7 shows a view of the lift truck disconnected from the platform;

Fig. 8 shows a fragmentary cross section through the pin socket on one of the platforms;

Fig. 9 shows a fragmentary cross section on the line 9—9 of Fig. 10 looking in the direction of the arrows but on enlarged scale;

Fig. 10 shows a vertical section on the line 10—10 of Fig. 7 looking in the direction of the arrows but on enlarged scale; and Fig. 11 shows a cross section substantially on the line 11—11 of Fig. 10 looking in the direction of the arrows.

Referring first to Figures 1 to 6 inclusive, each of the wheeled platforms includes a platform 13 having a pair of rear supporting wheels 14 and 15 mounted on a suitable axle beneath its rear end. Extending down from the bottom of the front portion of the platform 13 is a central support in the form of a pin 16, the upper end of which is fastened into a bracket 17. This bracket is in turn secured to the bottom of the platform 13 and will be described more in detail hereafter.

Figure 1:
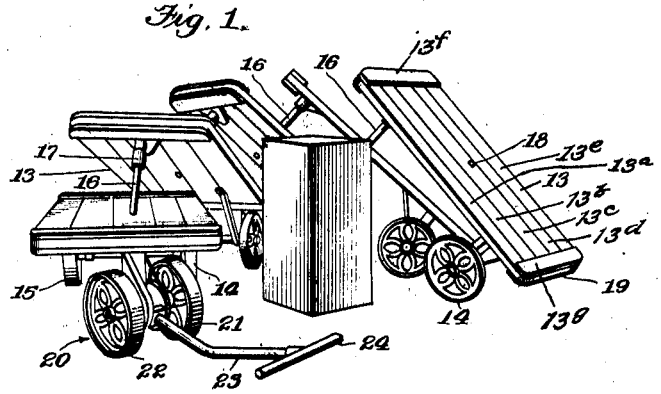
Fig. 1 shows a perspective of a train of platforms embodying the features of the present invention, nested together, the front end of the front platform being supported by the lift truck.

Reference particularly to Fig. 1 shows that the platform 13 is made of a series of longitudinally extending boards preferably of uneven number, five being illustrated in Fig. 1, these being the boards 13$^a$, 13$^b$, 13$^c$, 13$^d$, 13$^e$. These longitudinally extending boards are joined together at their front and rear ends by cross members 13$^f$ and 13$^g$ so as to establish a very rigid structure.

The bracket 17 already referred to is secured to the under side of the central board 13$^c$, thereby securing the connection in the strongest manner possible.

Figure 4:
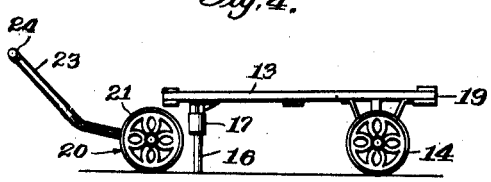
Fig. 4 shows a side view of one of the platforms standing alone upon the floor and with the lift truck directly in front of the same.

The central member 16 is of such height that when it is allowed to rest directly upon the floor as shown in Fig. 4 in particular the platform is supported in a substantially horizontal position, although it may have a slight downward tilt. When standing in this fashion the platform is supported on a three point support comprising the two heels and the central member aforesaid.

Figure 2:
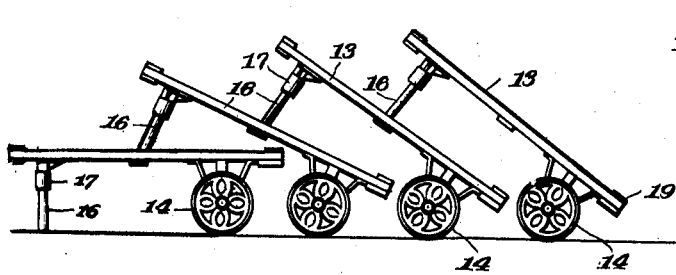
Fig. 2 shows a side view of a train of platforms nested together, the front end of the front platform being directly supported by the floor without any lift truck.
Figure 3:
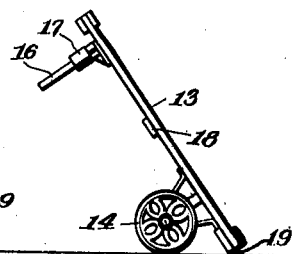
Fig. 3 shows a side view of one of the platforms standing alone upon its rear end.

There is mounted in each wheeled platform a socket 18 which is adapted to receive the lower end of the member 16 of the next succeeding platform member when the platform members are to be connected together in a train. These sockets 18 are located on the center lines of their respective platforms and preferably in the central board 13ᶜ, and said sockets are also set far enough back so that when the platforms are connected together as shown in Fig. 2 the rear portion of one platform will not interfere with the wheels of the next platform either when the train is being drawn along in a straight line or on a curve. This is readily evident from a comparison of Figs. 1 and 2. Furthermore, the parts are so proportioned that when a series of platforms is connected together after the fashion shown in Figs. 1 and 2, the center of gravity of each platform member is in advance of the rear axle so that a stable condition is established with all of the platforms trailing together as a train. Nevertheless, the arrangement is such that any platform member considered by itself may be tilted backwards into the position shown in Fig. 3, with its rear edge 19 resting on the floor, whereupon the center of gravity will move behind the position of the axle so that the platform member will stand upright alone.

In order to manipulate the platform members and allow them to be shifted about the floor, I have provided a small lift truck 20, such as shown in Figs. 1, 4, 5 and 6. The construction of this lift truck is shown in detail in Figs. 7 to 11 inclusive; but I will mention at this point that it includes a pair of wheels 21 and 22 which are spaced a sufficient distance from each other to provide a sufficient amount of lateral stability. Nevertheless these wheels are relatively close together. The lift truck also includes an operating handle 23 having a cross hand grip 24 at its upper end by which it is conveniently manipulated.

This lift truck is of such construction that it may be run in under the front end of the platform, and up to the position of the pin central support 16, and then by proper manipulation of the handle the lift truck may be caused to take the load of the platform. This is done by actually lifting the front end of the platform slightly so as to lift the central support 16 away from the floor. The details of the construction and operation of this lift truck will be given hereinafter.

Referring to Fig. 8, the same shows in detailed cross section one of the sockets 18; the same preferably comprises a recess 25 reaching into the upper face of the platform 13 to the position of the shoulder 26. A through perforation 27 continues on through the thickness of the platform so that the socket is self-cleaning. This socket is formed in the central board 13ᶜ.

A lining plate 28 is placed upon the shoulder 26 and has an opening 29 registering with the opening 27. Another lining plate 30 is preferably set around the upper end of the opening 25 so as to protect said upper end, said lining plate 30 having a central opening 31 of proper size to receive the lower end of the central support 16 of the trailing platform. The opening 29 is smaller than the central support 16, so that said central support is prevented from dropping through. Furthermore, the lining plate 30 is preferably countersunk into the platform 13 as clearly shown in Fig. 8.

The lift truck itself includes an axle 32 having the bearing ends 33 and 34 which are of reduced size and receive the hubs of the wheels 21 and 22 respectively. Said wheels are held in place by washers 34 and cotter pins 35 as will be readily understood from Fig. 11 in particular.

A pair of disks 36 and 37 are mounted upon the axle 32 between the wheel positions, being secured in place by the pins 38 and 39. The pins pass through the hubs 38ᵃ and 39ᵃ of the disk members 36 and 37 respectively, said hubs serving also to maintain the proper spacing of the wheels 21 and 22. The center faces of these disks are separated, a sufficient amount to accommodate a collar 40 which is journaled on the axle 32 between the disks; and the operating handle 23 has its inner end threaded or otherwise secured into said collar 40. The operating handle may thus be swung up and down with considerable freedom of movement, journaling on the axle 32.

Between the rear portions of the disks 36 and 37 there is journaled a bell crank lift hook 41, the same being journaled on the pin 42 which extends between the two disks. This hook 41 has its horizontal arm 43 notched or bifurcated as shown at 44 in Fig. 7 and of proper size to receive the central support 16 when the lift truck is run into place beneath a platform. This condition is evident from an examination of Fig. 10.

The central support 16 has its upper end secured into the bracket or bolster casting 17 already referred to, which bracket is secured to the bottom of the front portion of the platform. A tapered "fifth wheel" 44 is rotatably mounted on the central support 16 immediately below the position of the bracket 17. A retaining pin 45 is driven through the sleeve 44 and through the central support 16 and the ends of the pin 45 work in internal grooves 46 in the fifth wheel 44. Thus the fifth wheel is held close to the bracket 17 but is allowed free rotation on the central support 16.

With the foregoing arrangement the lifting up of the crank hook 41 will cause the same to take the load of the front portion of the truck through the medium of the fifth wheel, thereby lifting the central support 16 away from the floor, and at the same time the freedom of turning will not be seriously impaired by undue friction.

The horizontal arm 43 of the bell crank hook 41 is provided with a circular tapering recess 51 in its top face and around the position of the bifurcation 44 already referred to. This recess 51 accommodates the lower end of the fifth wheel 44 so that a satisfactory engagement of the parts is assured, thereby preventing the lower end of the fifth wheel from slipping away from the horizontal arm of the bell crank hook after the parts have once been engaged.

The disks 36 and 37 are separated from each other such a distance as compared to the diameter of the fifth wheel 44 that the axle 32 of the lift truck may oscillate through a considerable angle both sides of the horizontal without binding of the disks against the sides of the said fifth wheel, thus making it possible for the lift truck to ride over considerable inequalities in the surface of the floor without binding of the parts. Furthermore, the presence of the recess 51 in the top face of the horizontal arm of the bell crank hook permits the foregoing oscillation of the lift truck to take place and at the same time the proper engagement of the fifth wheel is maintained with the bell crank hook, the recess and fifth wheel working together in a manner similar to a ball and socket joint. The relative spacing of the disks as compared to the diameter of the fifth wheel is clearly evident from Fig. 11.

The vertical arm 47 of the bell crank hook 41 stands up between the two disks to such a height that its upper end may be provided with a cross pin 48. On one end of this cross pin there is a pawl 49 lying about the edge of the disk 37 and resting on the edge of said disk. This particular disk also has a notch 50 in such a position that when the disks are turned forwardly a sufficient distance to raise the pin 42 such a height as will cause the horizontal arm 43 to lift the central support 16 sufficiently above the floor, the pawl 49 may drop into the notch 50 thus locking the disks in said position. It will be noted that when the bell crank hook is forced down by the weight of the platform the vertical arm 47 of the bell crank hook 41 will rest against the fifth wheel 44 so that the tendency of the bell crank hook to turn backwardly an excessive amount under load is resisted.

It will be noted that the parts are so proportioned that when the bell crank hook is first moved under the position of the fifth wheel so as to engage the same, the pivot pin 42 stands almost directly behind the axle 32, and therefore the maximum rotative force must be exerted on the disks 36 and 37 in order to raise the pivot pin 42 and the bell crank hook together with the supported load. However, as the rotation of the disks 36 and 37 continues, the pivot pin 42 is carried up and over the axle 32 to a position almost directly above the axle as shown by the dotted circle in Fig. 10 so that in this position the load of the lift truck is supported or manipulated with a minimum amount of effort by the workman.

A pin 52 extends across the space between the two disks 36 and 37 at such a position that by swinging the handle 23 forwardly and downwardly to a position close to the floor the disks will be rotated in the proper direction to raise the pivot pin 42 together with the bell crank hook 41. The parts are so proportioned that before the operating handle strikes the floor the pawl 49 will drop into the notch 50, thus locking the disks in the forwardly turned position. Thereupon the operating handle may be raised to a convenient operating position, such fact being evidenced by comparison of Figs. 5 and 6, and the operating handle may be swung up and down as long as it does not strike the pin 52.

When it is desired to disengage the lift truck from the platform this may be done by again forcing the handle down close to the floor, so as to engage the cross pin 52, and then pulling upon the chain 53 which has its lower end connected to the pawl 49.

Owing to the condition already explained, the maximum force must be applied to the handle 23 when it stands in the nearly vertical position shown in Fig. 10, since at such time the pivot pin 42 is horizontally behind the axle 32; and the workman can most easily operate the handle under a heavy load when he stands in the erect position with the handle upright. On the other hand, as the handle is forced down so as to raise the pivot pin and carry it over the position of the axle, the force which must be applied to the handle becomes smaller and smaller, which is in harmony with the fact that the workman cannot as easily operate the handle under heavy loads when he is stooped down to a position close to the floor.

A guide block 54 is preferably mounted on the lower portion of the operating handle 23 between the two disks, said block 54 being of substantially the full clearance between the disks 36 and 37. Said block is held in place on the handle 23 by a cross tube 55 (see Fig. 9), which reaches through the handle and across the block 54 to positions close to the two disks 36 and 37. Balls 56 and 57 are set into the ends of the tube 55, said balls being forced apart by the spring 58 within the tube. The inner faces of the disks 36 and 37 are provided with recesses to accommodate the balls 56 and 57 at such points as it is desired to normally arrest the swinging of the handle. Thus the tube 55 performs two distinct functions.

A support arm 59 of peculiar shape is provided for standing the lift truck in upright position when not in use. This arm 59 may conveniently comprise an extension of the cross pin 52 already referred to. For this purpose said cross pin passes through the disk 37 and is then bent down and curved rearwardly so that its extreme end 60 may rest directly upon the floor. A spring 61 has one end connected to the hub 39ª of the disk 36 and the other end connected to the bracket member 59, said spring tending to swing the bracket member over into the position where it comes into direct contact with said hub 39ª of the disk 36. This position is illustrated in Fig. 10. The parts are so arranged that in this position the lift truck will stand alone when the handle 23 is in the upright position as shown in Fig. 10.

The pivotal and spring retracted support of the bracket member 59 makes it possible for said bracket member to turn out of the way, or be easily disengaged from any obstructions in the manipulation of the lift truck. At the same time this arrangement ensures a proper positioning of the bracket member to support the lift truck with the handle 23 in the upright position. Furthermore, said bracket member will act as a natural brake to resist any tendency of the lift truck to roll down grade when standing on a floor which is not level.

The chain 53 already referred to may be connected either directly to the pawl 49 or to the extension 62 of the pin 48, the pawl being fastened to said pin so that as the pin is rotated by pulling on the chain the pawl will be raised. This construction is illustrated in detail in Fig. 11.

It will be noted that the flange 36 is provided with a peripheral groove 63 which extends around approximately two thirds or three fourths of its circumference. Within this groove is seated a coiled spring 64. One end of said coiled spring is fastened to the disk at the point 65, and the spring then lies around two thirds or three fourths of the periphery and its other end is connected to a pin 66 on the extension of the shaft or pin 48 to which is secured the pawl 49. This spring 64 is originally assembled under considerable tension so that it tends to draw the pin 48 over in the proper direction to hold the vertical arm 47 of the bell crank hook over against the handle 23. At the same time this spring tends to rock the shaft 48 in such a direction as to hold the pawl in suitable contact with the periphery of the disk 37.

The upper end of the chain 53 is preferably connected to a trigger 67 pivoted to a handle bar at the point 68, said trigger being convenient for manipulation by the same hand which grasps the cross member 24 of the handle bar.

In manipulating this lift truck it is first shoved backwards beneath the front end of the platform so as to cause the slotted opening 44 to receive the central support 16. This movement is performed with the handle bar in a relatively raised or vertical position so as to allow the bell crank hook to stand in the lowered position illustrated in Fig. 10. As soon as the parts have been registered the handle bar is forced forwards and down to a position close to the floor, thus causing the block 54 to press against the cross pin 52 and thereby rocking both of the disks and raising the bell crank hook pivot pin 42. This will cause said bell crank hook to take the load of the fifth wheel and the front portion of the platform, and at the extreme limit of this movement the pawl 49 will snap into the recess 50, the chain 53 being released for that purpose. As soon as this position is reached the parts are so locked together that the handle bar can be raised into whatever position is convenient for an operation of the device.

In order to disengage the lift truck from the platform it is only necessary to force the handle bar down close to the floor, thereby causing the disks to rock forwards slightly and release the pressure on the pawl. Thereupon the chain may be pulled up by manipulation of the trigger 67 so as to disengage the pawl, after which the handle may be allowed to swing upwards into a vertical position, thus allowing the bell crank hook to lower and also allowing the front portion of the platform to be lowered so as to allow the central support 16 to rest directly on the floor. Thereafter the lift truck may be completely disengaged from the central support and moved away from the platform.

It will be noted from Fig. 11 in particular that the bracket 17 is relatively narrow, particularly in that portion thereof which extends down from the platform 13. As a consequence it is not necessary to place the wheels 21 and 22 very far apart, and still said wheels may be made of large diameter, reaching up to a position higher than the downwardly extending portion of the bracket 17 and without interference therewith.

Figure 6:
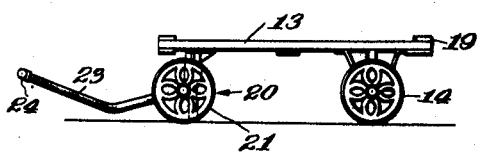
Fig. 6 shows a view similar to that of Fig. 5 with the exception that the handle has been forced down so as to cause the lift truck to take the load of the front portion of the platform.
Figure 5:
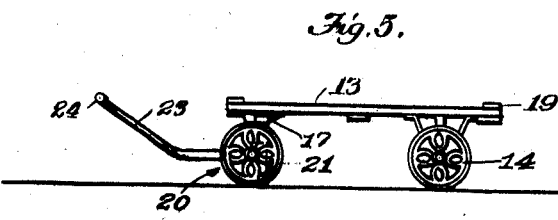
Fig. 5 shows a view similar to that of Fig. 4 with the exception that the lift truck has been moved back into position beneath the front end of the platform and with its handle raised so as to allow the parts to be properly engaged.

In fact, examination of Figs. 4, 5 and 6 will show that the wheels of the lift truck may be made of practically the same diameter as the rear wheels 14 of the platform.

Owing to this relatively large size of the lift truck wheels it is possible to operate the same with heavy loads over irregularities in the floor which could not possibly be negotiated with smaller wheels. For example the lift truck wheels may be made of a diameter of 14 or 15 inches without raising the platform elevation above those which are extensively used today.

Furthermore, the placing of the lift truck wheels relatively close together makes it possible to turn very sharp angles by easy manipulation of the handle 23 since the resistance of the lift truck to pivoting on its own center line, is directly proportional to the amount of lateral separation of its wheels.

Furthermore, it will be noted that the undersurface of the platform is substantially unobstructed, being provided only with the single downwardly depending central support in its front portion. As a result the lift truck may be approached to the central support from almost any convenient direction and properly engaged with the central support from such direction. This is possible through a range of more than 180°, so that the lift truck can be moved into position from either side or any position in advance thereof.

It will also be noted that the engagement of the central support with the lift truck is by the use of a male member on the platform together with a female socket on the lift truck. This also makes it possible to use the socket support of the horizontal arm of the bell crank lever with the lower end of the fifth wheel.

The provision of a socket in the central portion of each platform, in position to receive the lower end of the central support of the next unit of a train makes it possible to build the platform units up into a train with considerable portions of the successive units overlapping each other. This fact is clearly indicated in Fig. 2. As a result thereof it is possible to accommodate a train of ten empty platform units within the horizontal distance or floor area which would be necessary to accommodate only four of said platform units if coupled together in the ordinary manner and without overlapping. This makes it possible to move the empties around very much more economically than heretofore. For example, ten of said empties may be moved up or down in an elevator which would only accommodate four empties under other conditions.

Fig. 10 in particualr shows that when the central support 16 is raised its lower end occupies the dotted line position. In said position the lower end of the central support is completely accommodated within the surface of the cylinder defined by the periphery of the two front wheels 21 and 22. This being the case it is possible for the lift truck to be moved either up or down over bumps of considerable height without interference from the central support, assuming that said bumps are not substantially higher at points between the wheels than at the positions of the wheels.

While I have herein shown and described only a single embodiment of the features of my invention, still it will be understood that I do not intend to limit myself to said features except as I may do so in the claims.

I claim:

1. The combination with an industrial truck comprising a platform having rear supporting wheels and a downwardly depending front central supporting member of proper length to normally support the platform in a substantially horizontal position, of means for lifting and supporting the front portion of said platform with the lower end of the central supporting member raised above the floor, and permitting the platform so supported to be moved about, comprising a lift truck having a pair of wheels mounted upon an axle, a pair of separated disks journaled upon said axle between the wheels and separated from each other a distance sufficient to receive the central supporting member aforesaid there being a recess in the periphery of one of said disks, a bell crank hook pivoted between said disks and having a horizontal arm which is notched to receive the central supporting member and support the load of the front end of the platform, said bell crank hook also having a vertical arm with a pawl pivoted to its upper end and overriding the edge of one of the disks, an operating handle pivoted upon the axle between the disks, a cross pin between the disks at a position in advance of said handle and adapted to be engaged by the handle when the handle is swung forwards and downwards to thereby rock the disks and raise and move forwards the pivot point of the bell crank hook to cause the horizontal arm to take the load of the front portion of the platform and allow the pawl to drop into the recess of the disk aforesaid, whereby when the handle is thereafter released the load of the platform will depress the horizontal arm of the bell crank hook to swing the same until the vertical arm engages the central supporting member, substantially as described.

2. The combination with an industrial truck comprising a platform having rear supporting wheels and a downwardly depending front supporting member of proper length to normally support the platform in a substantially horizontal position, of means for lifting and supporting the front portion of said platform with the lower end of the supporting member raised above the floor and permitting the platform so supported to be moved about, comprising a lift truck having a pair of wheels mounted on an axle, a disk journaled upon said axle between the wheels there being a recess in the periphery of said disk, a bell crank hook pivoted against the face of said disk and having a horizontal arm which is adapted to receive the supporting member and support the load of the front end of the platform, said bell crank hook also having a vertical arm with a pawl pivoted to its upper end and overriding the edge of the disk, an operating handle pivoted upon the wheel adjacent to the disk, a pin in the face of the disk at a position in advance of said handle and adapted to be engaged by the handle when the handle is swung forwards and downwards to thereby rock the disk and raise the pivot point of the bell crank hook to cause the horizontal arm to take the load of the front portion of the platform and allow the pawl to drop into the recess of the disk, whereby when the handle is thereafter released, the load of the platform will depress the horizontal arm of the bell crank hook to swing the same until the vertical arm engages the supporting member substantially as described.

3. The combination with an industrial truck comprising a platform having a downwardly depending front supporting member of proper length to normally support the platform in a substantially horizontal position, of means for lifting and supporting the front portion of said platform with the lower end of the supporting member raised above the floor, and permitting the platform so supported to be moved about, comprising a lift truck having a pair of wheels mounted upon an axle, a horizontal pin located between said wheels, means for supporting said pin while permitting it to be raised and lowered with respect to the axle, a bell crank hook pivoted on said pin and having a horizontal arm adapted to receive the supporting member and support the load of the front end of the platform, said bell crank hook also having a vertical arm with a pawl pivoted to its upper end, a notched member adjacent to said pawl and having its notch travelling horizontally while the hook pin travels vertically, an operating handle pivoted upon the axle, an abutment in conjunction with the notched member and travelling therewith, the operating handle being adapted to engage said abutment to move the notched member forwards and the bell crank hook upwards when the handle is swung forwards, to thereby raise the pivot point of the bell crank hook and cause the horizontal arm to take the load of the front portion of the platform and allow the pawl to drop into the notch of the notched member, and whereby when the handle is thereafter released the load of the platform will depress the horizontal arm of the bell crank hook to swing the same until the vertical arm engages the supporting member of the platform, substantially as described.

4. A lift truck for the purpose specified comprising in combination a pair of wheels, an axle upon which said wheels are journaled, a pair of disks journaled upon the axle between the wheels, a cross pin between the disks and secured to them, a bell crank hook pivoted on said cross pin and having a horizontal arm which is adapted to carry the load and also having an upwardly extending vertical arm, a handle pivoted on the axle between the disks, a pawl pivoted to the upper end of the vertical arm of the bell crank hook and overlying one of the disks, said disk being notched, an abutment extending between the two disks in advance of the position of the handle, spring means normally tending to draw the upper end of the bell crank hook and the pawl forwards with respect to the notched disk, and suitable means for supporting the lift truck with the handle in raised position comprising a foot member pivoted to one of the disks in its upper forward portion and reaching downwardly and under the axle to a position behind the axle, together with means normally tending to retain said foot member adjacent to the axle, substantially as described.

5. A lift truck for the purpose specified comprising in combination suitable supporting wheels, a cross axle on which they are journaled, a pair of disks journaled on said axle between the wheels, a bell crank hook between the said disks and pivoted thereto and having a horizontal rearwardly reaching arm adapted to support the load and also having a vertical upwardly reaching arm, a forwardly extending pawl pivoted to the upper end of said arm and overriding one of the disks, said disk being notched, the position of the said notch being such that the bell crank hook is raised into the load supporting position when the pawl is engaged with the notch, an operating handle pivoted on the axle between the disks, a cross abutment between the disks in advance of said axle, and a spring having one end connected to the upper end of the vertical arm of the bell crank hook and the other end extending a substantial distance around the periphery of one of the disks, substantially as described.

6. A lift truck for the purpose specified comprising in combination, a pair of wheels, an axle upon which they are journaled, a pair of disks journaled on said axle between the wheels, a bell crank hook between the disks and pivotally connected to their inner faces, said bell crank hook having a horizontal rearwardly extending load supporting arm and also having a vertical arm, a forwardly extending pawl pivoted to the upper end of said vertical arm and overlying one of the disks, said disk being notched at a position to permit engagement of said pawl with the notch when the load supporting arm is at the raised position, an operating handle between the disks and having its inner end journaled upon the axle, and a cross abutment extending between the two disks at a position in advance of said handle and adapted to be engaged by the handle substantially as described.

7. A lift truck for the purpose specified comprising in combination a pair of wheels, an axle upon which they are journaled, a pair of disks journaled upon said axle between the wheels, a lift member connected to and located between the disks, an operating handle pivoted on the axle between the disks, a cross member supported by the disks in advance of said handle and in position to be engaged by the handle when the handle is rocked forwards, to thereby turn the disks on the axle, said cross member being unconnected to the handle and free to move in one direction away from the handle and being located at such a position that the handle engages the cross member as an abutment with the handle standing in a substantially upright position when the lift member stands directly behind the position of the axle, substantially as described.

8. A lift truck for the purpose specified comprising in combination a pair of wheels, an axle upon which they are journaled, a disk journaled on the said axle between the wheels, a lift member pivoted to the disk and having a horizontal load supporting element, an operating handle pivoted to the axle adjacent to the disk, an abutment on the disk in advance of the handle in position to be engaged by the handle when the handle is swung forwards and downwards, said abutment being unconnected to the handle and free to move in one direction away from the handle, the parts being so proportioned that the abutment and handle are normally in engagement with the handle standing substantially upright and with the load supporting pivot directly behind the axle, and also such that when the handle is forced down into a substantially horizontal position the pivot aforesaid occupies the position substantially above the axle, substantially as described.

9. A lift truck for the purpose specified comprising in combination a pair of wheels, an axle upon which they are journaled, a rotatable lifting member concentric with the axle, a load support pivoted to said lifting member and having a substantially horizontal load supporting element, a swinging handle pivoted concentric with the axle, and an abutment between the handle and the rotatable lifting member connected to one of said elements and unconnected to the other element and located in such position that when the handle stands in substantially upright position with said abutment engaged, the load supporting element aforesaid is substantially behind and in line with the axle, substantially as described.

10. The combination with an industrial truck comprising a platform having rear supporting wheels and a downwardly depending front central supporting member of relatively small diameter and of proper length to normally support the platform in a substantial horizontal position, of means for lifting and supporting the front portion of the said platform with the lower end of the central supporting member raised above the floor, and permitting the platform so supported to be moved about, comprising a lift truck having a pair of wheels mounted upon an axle, a pair of separated disks journaled upon said axle between the wheels and separated from each other a distance sufficient to receive the central supporting member aforesaid and to allow a substantial amount of rocking motion of the lift truck axle with respect to the central supporting member without occasioning any binding action between the parts, a bifurcated member between the disks of the lift truck adapted to receive the central supporting member when the lift truck is in working position with respect to the platform, there being an annular socket in the upper face of said bifurcated member, and a fifth wheel on the central supporting member having its lower end of proper size and contour to seat into said recess and permit swinging movements of the disks and supporting member with respect to the central supporting member and fifth wheel without any binding action, substantially as described.

11. The combination with an industrial truck comprising a platform having rear supporting wheels and a downwardly depending front central supporting member of proper length to normally support the platform in a substantially horizontal position, of a fifth wheel journaled on the upper portion of the said central supporting member, means for retaining said fifth wheel in such position, a bearing member between the fifth wheel and the lower face of the platform, together with means for engaging the central supporting member and fifth wheel for the purpose of lifting the same to bring and support the lower end of the central supporting member above the level of the floor, comprising a pair of wheels of relatively large size, but of smaller size than the clearance of the platform above the floor when the central supporting member rests upon the floor, an axle upon which said wheels are journaled, a rotatable lifting member on the axle between the wheels, a substantially horizontal bifurcated lifting element on said rotatable lifting member, having its bifurcations adapted to receive the central supporting member, there being an upwardly facing recess in said bifurcated member of proper size and contour to receive the lower end of the fifth wheel and support the same while permitting relative oscillations between the bifurcated member and the fifth wheel and central supporting member without binding, together with an operating handle journaled in the lift truck to swing about a horizontal axis, substantially as described.

12. The combination with an industrial truck comprising a platform having rear supporting wheels and a downwardly depending front central supporting member of proper length to normally support the platform in a substantially horizontal position, of a lift truck for raising and supporting the front portion of the platform member with the lower end of the central supporting member above the floor, said lift truck comprising a pair of wheels of relatively large size, an axle on which they are journaled, a vertically movable lifting element between the wheels and behind the axle, said lifting element being adapted to engage the central supporting member to lift the front portion of the platform, and means for raising the lifting member when so engaged through a distance sufficient to carry the lower end of the central supporting member upwardly and forwardly to a position within a cylinder defined by the peripheries of the two wheels of the lift truck, substantially as described.

13. In a truck capable of normally carrying a superimposed load on a pair of wheels and a leg support, means for shifting the load from the support to an auxiliary set of wheels, said means comprising a pair of wheels, a body carried by the wheels, and a post pivotally swung from the body adapted to be raised and lowered by rocking said body between said wheels, said post being formed to pivotally engage said truck, and releasable means cooperating between said body and said post to secure said post in its elevated position.

LEE B. JONES.